United States Patent
Rasmussen et al.

(10) Patent No.: US 10,378,817 B2
(45) Date of Patent: Aug. 13, 2019

(54) FLEXIBLE LIQUEFIED NATURAL GAS PLANT

(71) Applicants: Chad C. Rasmussen, Kuala Lumpur (MY); Garth M. Norman, Houston, TX (US); Michael R. Miller, Houston, TX (US); Justin G. Brennan, Levittown, PA (US)

(72) Inventors: Chad C. Rasmussen, Kuala Lumpur (MY); Garth M. Norman, Houston, TX (US); Michael R. Miller, Houston, TX (US); Justin G. Brennan, Levittown, PA (US)

(73) Assignee: ExxonMobil Upstream Research Company, Spring, TX (US)

(*) Notice: Subject to any disclaimer, the term of this patent is extended or adjusted under 35 U.S.C. 154(b) by 373 days.

(21) Appl. No.: 14/886,697

(22) Filed: Oct. 19, 2015

(65) Prior Publication Data
US 2016/0040928 A1  Feb. 11, 2016

Related U.S. Application Data (62) Division of application No. 13/580,131, filed as application No. PCT/US2011/020249 on Jan. 5, 2011, now abandoned.

(60) Provisional application No. 61/311,031, filed on Mar. 5, 2010.

(51) Int. Cl.
| | |
|---|---|
| F25J 1/00 | (2006.01) |
| F01D 15/00 | (2006.01) |
| F01D 15/10 | (2006.01) |
| F02C 6/04 | (2006.01) |

(Continued)

(52) U.S. Cl.
CPC .......... *F25J 1/0022* (2013.01); *F01D 15/005* (2013.01); *F01D 15/10* (2013.01); *F02C 6/04* (2013.01); *F25J 1/0052* (2013.01); *F25J 1/0242* (2013.01); *F25J 1/0245* (2013.01); *F25J 1/0283* (2013.01); *F25J 1/0284* (2013.01); *F25J 1/0287* (2013.01); *F25J 1/0289* (2013.01); *F25J 1/0294* (2013.01); *H02K 99/10* (2016.11); *F05D 2210/12* (2013.01); *F25J 1/00* (2013.01); *F25J 2220/62* (2013.01); *F25J 2230/22* (2013.01);

(Continued)

(58) Field of Classification Search
CPC ........ F25J 2230/22; F25J 2230/24; F25J 1/00; F25J 1/0022; H02K 57/00; H02K 57/003
USPC .................................................. 62/611, 612
See application file for complete search history.

(56) References Cited

U.S. PATENT DOCUMENTS

| | | | |
|---|---|---|---|
| 5,491,969 A | 2/1996 | Cohn et al. | 60/39.05 |
| 5,600,969 A | 2/1997 | Low | 62/622 |
| 6,463,740 B1 | 10/2002 | Schmidt et al. | 60/772 |

(Continued)

*Primary Examiner* — Joel M Attey
(74) *Attorney, Agent, or Firm* — ExxonMobil Upstream Research Company Law Department (57) ABSTRACT

The present techniques are directed to a flexible liquefied natural gas (LNG) plant that may be tied to an external electric grid for importing or exporting electric power. Exemplary embodiments provide a method for producing LNG that includes producing a base load capacity of refrigeration capacity for LNG production from a first compression system. Electricity may be produced from a second compressor string if electricity is needed by an external power grid, or a second amount of refrigeration capacity may be provided by the second compressor string is natural gas feed is available and the external grid does not need power.

5 Claims, 6 Drawing Sheets

(51) Int. Cl.
  *F25J 1/02* (2006.01)
  *H02K 99/00* (2014.01)
(52) U.S. Cl.
  CPC ........ *F25J 2230/24* (2013.01); *F25J 2240/70* (2013.01); *F25J 2240/82* (2013.01)

(56) References Cited

U.S. PATENT DOCUMENTS

| | | | |
|---|---|---|---|
| 6,647,744 B2 | 11/2003 | Fanning et al. | 62/612 |
| 6,742,358 B2 | 6/2004 | Wilkinson et al. | 62/613 |
| 6,920,759 B2 | 7/2005 | Wakana et al. | 60/726 |
| 6,945,076 B1 * | 9/2005 | Garnier | F25J 3/04296 62/643 |
| 7,114,351 B2 | 10/2006 | Jones, Jr. et al. | 62/611 |
| 7,526,926 B2 * | 5/2009 | Rasmussen | F01D 15/005 290/52 |
| 8,269,449 B2 | 9/2012 | Bjerknes et al. | 318/723 |
| 2001/0004830 A1 * | 6/2001 | Wakana | F02C 6/14 60/39.182 |
| 2003/0101728 A1 * | 6/2003 | Wakana | F02C 6/14 60/727 |
| 2007/0056318 A1 | 3/2007 | Ransbarger | 62/611 |
| 2007/0193303 A1 * | 8/2007 | Hawrysz | C10L 3/10 62/612 |
| 2007/0204649 A1 * | 9/2007 | Kaart | F04D 27/0207 62/612 |
| 2008/0115529 A1 | 5/2008 | Ransbarger et al. | 62/613 |
| 2008/0163645 A1 * | 7/2008 | Konishi | F25J 1/0208 62/620 |
| 2008/0202159 A1 * | 8/2008 | Fountain | F25J 1/0022 62/612 |
| 2008/0256976 A1 | 10/2008 | Eaton | 62/612 |
| 2009/0217701 A1 * | 9/2009 | Minta | F25J 1/0022 62/612 |
| 2009/0260367 A1 | 10/2009 | Martin et al. | 60/778 |
| 2010/0154469 A1 * | 6/2010 | Eaton | F25J 1/0218 62/612 |

* cited by examiner

FIG. 12

FLEXIBLE LIQUEFIED NATURAL GAS PLANT

CROSS-REFERENCE TO RELATED APPLICATION

This is a divisional application of U.S. Non-provisional application Ser. No. 13/580,131, filed Oct. 11, 2012, and claims the priority benefit thereof and of U.S. Provisional Patent Application 61/311,031 filed 5 Mar. 2010 entitled FLEXIBLE LIQUEFIED NATURAL GAS PLANT, the entirety of which are incorporated by reference herein.

FIELD

Exemplary embodiments of the present techniques relate to a liquefied natural gas plant with flexible capability to provide liquefied natural gas, pipelined natural gas, or electricity to a grid.

BACKGROUND

Large volumes of natural gas (i.e., primarily methane) are located in remote areas of the world. This gas has significant value if it can be economically transported to market. Where the gas reserves are located in reasonable proximity to a market and the terrain between the two locations permits, the gas is typically produced and then transported to market through submerged and/or land-based pipelines. However, when gas is produced in locations where laying a pipeline is infeasible or economically prohibitive, other techniques must be used for getting this gas to market.

A commonly used technique for non-pipeline transport of gas involves liquefying the gas at or near the production site and then transporting the liquefied natural gas to market in specially-designed storage tanks aboard transport vessels. The natural gas is cooled and condensed to a liquid state to produce liquefied natural gas ("LNG"). LNG is typically, but not always, transported at substantially atmospheric pressure and at temperatures of about −162° C. (−260° F.), thereby significantly increasing the amount of gas which can be stored in a particular storage tank on a transport vessel. Once an LNG transport vessel reaches its destination, the LNG is typically off-loaded into other storage tanks from which the LNG can then be revaporized as needed and transported as a gas to end users through pipelines or the like. LNG has been an increasingly popular transportation method to supply major energy-consuming nations with natural gas.

Processing plants used to liquefy natural gas are typically built in stages as the supply of feed gas, i.e., natural gas, and the quantity of gas contracted for sale increase. One traditional method of building an LNG processing plant is to build up a plant site in several sequential increments, or parallel trains. Each stage of construction may consist of a separate, stand-alone train, which, in turn, is comprised of all the individual processing units or steps necessary to liquefy a stream of feed gas into LNG and send it on to storage. Each train may function as an independent production facility. Train size can depend heavily upon the extent of the resource, technology and equipment used within the train, and the available funds for investment in the project development. Generally, the compressors are driven by combusting a portion of the natural gas feed in a gas turbine engine to generate mechanical energy, which is transferred to the compressor by a shaft. However, so called all-electric LNG plants have been conceptually discussed. In all-electric LNG plants, the refrigeration compressors are driven by electric motors, powered by a central power plant within the all-electric LNG plant. The central power plant uses gas turbines to generate electricity for an internal electric grid that powers the electric compressors. A benefit of this approach is that the gas turbines are located in a centralized power plant improving ease of maintenance activities.

Typical base load LNG plants are built to liquefy gas from a dedicated reservoir or set of reservoirs. For example, a base load LNG plant may have a production capability of 1-5 megatons/year (MTA), selected to match the amount of natural gas available for feed and fuel. Since the intent is to run continuously at maximum capacity, little emphasis is placed on the turndown capability of the plant other than to ensure that there is a range of operability during startup or process upset. LNG plants are often limited by the ability of the compressor driver to turn down efficiently. Turn down capability of the gas treating units may be limited.

LNG production may also be used for storing natural gas. For example, LNG peak shaving plants can be designed to balance pipeline capacity by storing LNG in tanks until it is economic to gasify the LNG for pipeline distribution. They are similar in function to underground storage of natural gas. Peak shaving plants have stand-alone gas treating facilities and, although they do have the flexibility to operate over a range of turndown, have significantly lower liquefaction capacity than base load LNG plants. Peak shaving plants have throughput ranging in the 1-20 MMSCFD range. 20 MMSCFD is approximately equivalent to 0.15 MTA, which is about 6 times smaller than the lower range of LNG base load plant capacity (1 MTA or 128 MMSCFD). Peak shaving plants typically operate with one motor or gas turbine driven compressor.

Countries with natural gas reserves commonly use a portion of the gas for domestic power generation. In most cases, the natural gas is treated upstream of the power plants to remove contaminants, such as $H_2S$, $CO_2$, and water. The treating equipment can be sized to provide a treated gas stream flow rate that is sufficient to meet the expected peak demand of the power utility. However, the power demand on a domestic grid typically swings with the ambient temperature and the gas treating facilities may be under-utilized except during the peak demand seasons, such as during the hottest months when air conditioning demand is high.

Due to the increase in demand seen in recent years, increased emphasis has been placed on cost and schedule efficiency of new gas liquefaction projects in order to reduce the cost of the delivered gas. Large natural gas liquefaction projects expose the developers to substantial commercial risk due to the large initial capital costs ($5 billion or more) of these projects. Improvements in cost, design, and schedule efficiency can help mitigate the substantial commercial risk associated with large LNG development projects.

SUMMARY

An exemplary embodiment of the present techniques provides a method for producing liquefied natural gas (LNG). The method includes producing a base load refrigeration capacity for LNG production from a first compression system and producing electricity from a second compression system, wherein the second compression system is configured to export the electricity to an external power grid when needed.

The method may include producing a second amount of refrigeration capacity from the second compression system if electricity is not needed by an external power grid and natural gas feed is available. The method may also include producing a third amount of refrigeration capacity from a third compression system if electricity is available from the external power grid and natural gas feed is available.

The first compressor string, the first compression system, the second compression system, and the third compression system may share inlet and outlet manifolds for a refrigerant. The method may also include increasing compression power in the first compressor string by powering a motor/generator from the external power grid, wherein the motor/generator is in parallel with a gas turbine coupled to a compressor string. The method may include increasing compression power in the second compression system by powering a motor/generator from the external power grid, wherein the motor/generator is in parallel with a gas turbine coupled to a compressor string.

Another exemplary embodiment of the present techniques provides a compression system. The compression system includes a gas turbine engine, and a motor/generator sized to match an output power from the gas turbine engine, wherein the motor/generator is configured to be powered by the gas turbine engine. The compression system also includes a compressor string sized match the output power from the gas turbine engine, wherein the compressor string is configured to be powered by the gas turbine engine. Further, the compression system includes a decoupling device located between the motor/generator and the compressor string, wherein when the decoupling device is disengaged, the gas turbine engine is configured to directly drive the motor/generator without transferring energy to the compressor string. The decoupling device may include a clutch.

The compression system may also include a second decoupling device located between the gas turbine engine and the motor/generator, wherein when the second decoupling is disengaged, the motor/generator is configured to directly drive the compressor string without transferring energy to the gas turbine engine.

Another exemplary embodiment of the present techniques provides a flexible liquefied natural gas (LNG) plant. The flexible LNG plant includes a first gas turbine-driven gas compression system that includes a gas turbine, a motor/generator, and a first compressor string. The motor/generator is sized to match the power output of the gas turbine and the motor/generator is configured to provide electricity to an outside utility grid. The flexible LNG plant also includes an electric motor-driven compression system that includes an electric motor and a second compressor string. An inlet line of the second compressor string shares a common manifold with the first compressor string and an outlet line of the second compressor string shares a common manifold with the first compressor string.

The flexible LNG plant may further include a second gas turbine-driven compression system. The second gas turbine-driven compression system includes a third compressor string configured to provide a base load refrigerant compression capacity for a LNG plant. An inlet line of the third compressor string shares a common inlet manifold with the first compressor string and the second compressor string and an outlet line of the third compressor string shares a common outlet manifold with the first compressor string and the second compressor string.

The electric motor-driven compression system of the flexible LNG plant may be configured to be powered from an outside utility grid. A refrigerant in the flexible LNG plant is propane, a mixed hydrocarbon refrigerant, nitrogen, or any combinations thereof. In embodiments, the gas turbine may be coupled to the motor/generator and decoupled from the second compressor string.

The first gas turbine-driven gas compression system may include a clutch located on a shaft between the motor/generator and the first compressor string. The clutch may be configured to disengage the second compressor string from the gas turbine, allowing the gas turbine to drive the motor/generator. The electric motor-driven compression system may be at least partially powered by the motor/generator from a parallel compression system.

A clutch may be located between the gas turbine and the motor/generator. The clutch may be configured to disengage the gas turbine from the motor/generator to allow the motor/generator to drive the second compressor string. A variable speed drive may be located between the motor/generator and the first compressor string. A heat recovery unit may be located on an exhaust from a gas turbine in the flexible LNG plant. The flexible LNG plant may include a steam turbine driven from steam generated by heat recovered from the heat recovery unit.

DESCRIPTION OF THE DRAWINGS

The advantages of the present techniques are better understood by referring to the following detailed description and the attached drawings, in which.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Acid gases" are contaminants that are often encountered in natural gas streams. Typically, these gas include carbon dioxide and hydrogen sulfide, although any number of other contaminants may also form acids. Acid gases are commonly removed by contacting the gas stream with an absorbent liquid, which may react with the acid gas. When the absorbent liquid becomes acid-gas "rich", a desorption step can be used to separate the acid gases from the absorbent liquid. The "lean" absorbent liquid is then typically recycled for further absorption.

As used herein, a "compressor string" refers to one or more compressors used in a single refrigerant service in a single compression system. A compressor is a mechanical device used to increase the pressure of a gas by reducing its volume. A compressor string may have a single compressor, such as an axial flow compressor, having multiple entry points for vapor at different pressures. Further, a compressor string may have multiple isolated compressors, such as centrifugal compressors, along a single shaft. The compressor strings may be driven by gas turbine engines, electric motors, or a combination thereof.

As used herein, a "compression system" refers to a system that includes drive motors, auxiliary equipment, and compressor strings for two or more refrigerants used to provide cooling capacity for LNG production. The compressor strings in a single compression system are used together, for example, to provide cooling capacity for LNG production. In embodiments, the gas turbine engines and motor/generators of a compression system may be pulled from compression duty and used together to generate electrical power for an electrical grid.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon although nitrogen, sulfur, oxygen, metals, or any number of other elements may be present in small amounts. As used herein, hydrocarbons generally refer to organic materials that are harvested from hydrocarbon containing sub-surface rock layers, termed reservoirs. For example, natural gas is a hydrocarbon.

"Liquefied natural gas" or "LNG" is cryogenic liquid form of natural gas generally known to include a high percentage of methane, but also other elements and/or compounds including, but not limited to, ethane, propane, butane, carbon dioxide, nitrogen, helium, hydrogen sulfide, or combinations thereof. The natural gas may have been processed to remove one or more components (for instance, helium) or impurities (for instance, water and/or heavy hydrocarbons) and then condensed into the liquid at almost atmospheric pressure by cooling.

The term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas will also typically contain ethane ($C_2$), higher molecular weight hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Sour gas" generally refers to natural gas containing acid gases such as hydrogen sulfide ($H_2S$) and carbon dioxide ($CO_2$). When the $H_2S$ and $CO_2$ have been removed from the natural gas feedstream (for example, decreased to 10 ppm or less, or 5 ppm or less), the gas is classified as "sweet."

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

When large gas reserves are available, an owner has an economic driver to use a gas treating facility at maximum throughput at all times, even though the purified gas produced may not needed for domestic customers or power generation. In exemplary embodiments of the present techniques, a flexible LNG plant can use the excess gas treating capacity during the off-peak power demand periods to produce liquefied natural gas (LNG).

In addition, peak power demand from an electric grid may exceed the electrical generation capabilities of the domestic utilities. When this occurs, additional peak shaving power generation (peaking units) may be used to meet the electricity demand. A peaking unit may require a large capital expenditure for installation and maintenance and may only be operating a fraction of the time. Exemplary embodiments of the flexible LNG plant can provide peaking units for contributing power to an electric grid without the need for constructing separate peaking units.

The development of a global and liquid LNG market also allows for LNG spot contracts. Therefore, a gas producer may produce power directly from gas by generating electricity, produce cargos of LNG as the market demands, or feed a domestic gas pipeline for industrial and residential use. The use of a flexible LNG plant can permit the use all three of these methods for commercializing a gas resource. The flexible LNG plant may also allow an operator to balance gas resource monetization options based on current markets.

In an exemplary embodiment, the flexible LNG plant is integrated with the domestic electrical utility grid. Accordingly, the plant can import power from the grid or export power to the grid. By importing power, the flexible LNG plant can take advantage of the excess power generation capacity at an unaffiliated power utility to level out cyclical swings in demand on the utility. Power plants typically have minimum load capabilities and operate with higher fuel efficiency at full capacity. The importing capability can be constructed into the flexible LNG plant by use of large electric motors as compressor drivers. The imported power from the utility grid may be used to power to the electric motors. By exporting power, the flexible LNG plant can provide peaking power generation service for the domestic utility. This may enable the utility to delay capital projects for installation of dedicated peaking units or base load power generation projects.

Flexible LNG Plant

Figure 1:
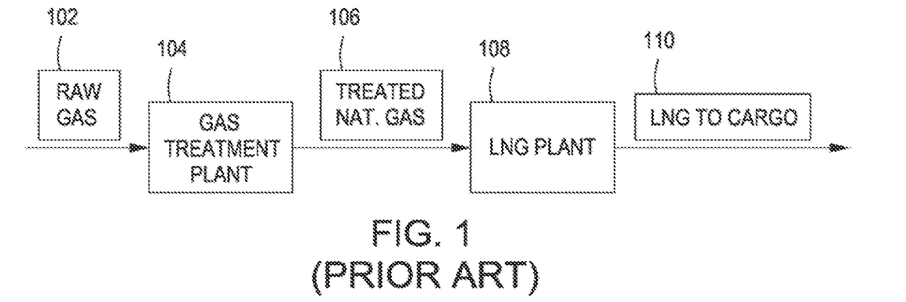
FIG. 1 is a block diagram of a liquefied natural gas (LNG) plant.

FIG. 1 is a block diagram of a conventional liquefied natural gas (LNG) plant 100. As shown in FIG. 1, a raw gas feed 102 is processed in a gas treatment plant 104. The gas treatment plant 104 may remove acid gases (such as $CO_2$ and $H_2S$), as well as water, heavier hydrocarbons (such as $C_2$'s and higher), and other impurities. The treated natural gas 106 is cooled and liquefied in a LNG Plant 108. As noted previously, a portion of the treated gas 106 may be combusted in gas turbines to power refrigerant compressors. After the LNG is produced, it is transferred to a cargo loading point 110, where it may be loaded into ships or other LNG transport vessels to be carried to an energy consuming location.

Figure 2:
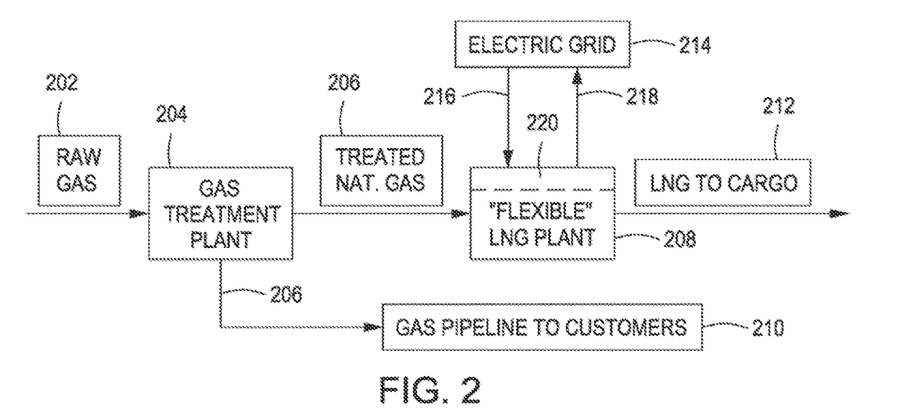
FIG. 2 is a block diagram of a flexible LNG plant.

FIG. 2 is a block diagram of a flexible LNG plant 200. As shown in FIG. 2, a raw gas feed 202 is processed in a gas treatment plant 204. As for the gas treatment plant 104 of FIG. 1, the gas treatment plant 204 may remove acid gases and water. A variety of processes have been used to treat the gas to remove acid gases (for example, $H_2S$ and $CO_2$, among others). For example, the raw gas stream 202 can be contacted with a solvent (including for example, organic amines such as methyldiethanolamine and other additives) to absorb the acid gases and carry them out of the gas stream. The solvent can be regenerated so that it can be reused in the treatment process. During regeneration, the acid gases and hydrocarbon contaminants are removed or substantially reduced in the solvent.

The water may be removed in a dehydration unit in the gas treatment plant 204, for example, using molecular sieves and/or glycol processes. The water content can be decreased to a dew point level that is compatible with the LNG product temperature of −260° F. The dehydration adsorbent vessels may generally be comprised of parallel vessels which cycle from dehydrating the feed gas to regenerating mode.

Other process units may be included in the gas treatment plant 204, for example, to remove natural gas liquids such as components with three or more carbon atoms. At higher carbon content, such as four carbon atoms or more, these components may condense and separate from the natural gas stream. Lighter components may be removed by adsorption techniques or cryogenic processing.

The treated natural gas 206 may be used as a feed to a flexible LNG plant 208, which may have a base capacity that is sized to match the excess gas available from the gas treatment plant 204, e.g., the amount of gas beyond the baseload requirements of other users. A portion of the treated natural gas 206 may be transferred to a pipeline 210 for distribution to customers, such as an electrical generation utility, commercial consumers, or residential consumers, among others. The pipeline 210 may be fed from the gas treatment plant 204, bypassing the flexible LNG plant 208, or from the flexible LNG plant 208, for example, using on-site equipment.

The flow of the treated natural gas 206 may be divided between the pipeline 210 and the flexible LNG plant 208 on the basis of demand from the customers on the pipeline 210 versus the demand from the flexible LNG plant 208. For example, if the amount of treated natural gas 206 exceeds the needs of customers on the pipeline 210, the excess natural gas may be used to increase the amount of LNG 212 generated in the flexible LNG plant 208.

Further, the flexible LNG plant 208 can be coupled to an electric grid 214. As discussed in detail below, electric motor compressor drives may use power imported from the electric grid 214, as indicated by reference numeral 216 to increase the amount of LNG generated. If more electric power is needed by the grid, one or more gas turbine compression systems may include full-size motor/generators that can be configured to export power to the electric grid 214, as indicated by reference numeral 218.

The flexible LNG plant 208 can be used to produce LNG 212 for shipment in an amount that depends on the capacity of the source of the raw gas 202 and the demand from either the electric grid 214, and/or customers on the pipeline 210. The flexibility can be provided by a compression section 220 of the flexible LNG plant 208 that is configured to provide either refrigerant or electric power, as discussed in detail below.

In an exemplary embodiment, the flexible LNG plant 208 may have a base load capacity (i.e., continuous LNG production capacity) of approximately 1-5 MTA, 2-4 MTA, or 2.9 MTA. Further, the LNG plant may have a full capacity of 1.5, 2, 3, or more times the base load capacity, for example, 1.5-15 MTA, 2-10 MTA, or 9 MTA, as more refrigerant capacity is brought on-line. The plant may also have an electric generation capacity of 60 MW-1500 MW, 100 MW-250 MW, or 135 MW. In exemplary embodiments, the flexible LNG plant 208 combines parallel trains of gas and electrically driven compressors to allow power import and/or export. The flexible LNG plant 208 is not limited to these amounts, as larger or smaller capacities may be installed, for example, by increasing the number of trains or by decreasing the size of the units in a single train. Accordingly, the refrigerant and electric lines can be shared as utilities in the plant, for example, as illustrated in FIG. 3.

LNG Cooling and Condensation

Figure 3:
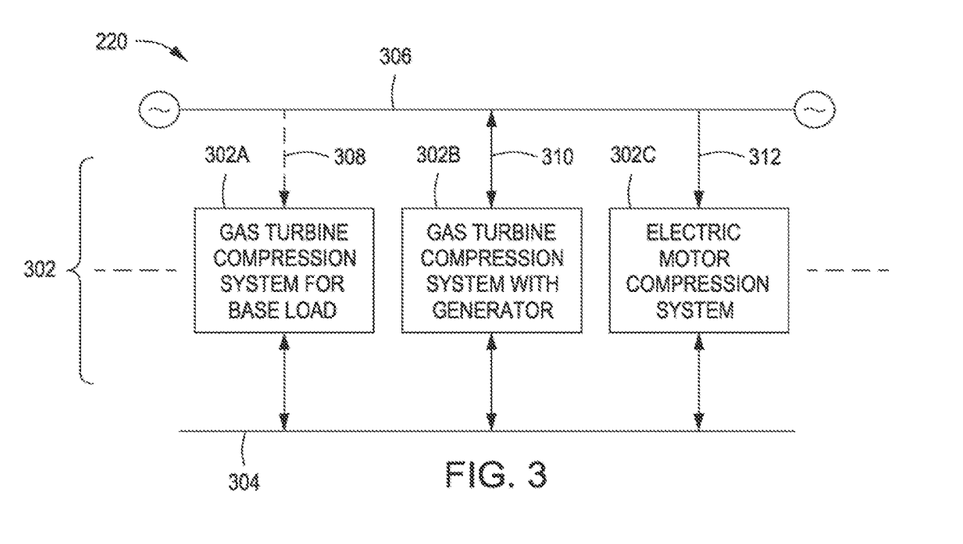
FIG. 3 is a block diagram illustrating the use of electrical and refrigerant lines as utilities.

FIG. 3 is a block diagram of the compression section 220 of a flexible LNG plant 208. In the compression section 220, a series of compression systems 302 can share a common set of refrigerant manifolds 304 and a common electrical bus 306 that may be coupled to an external power grid 214 (FIG. 2). The compression systems 302 may be configured to provide different capabilities to the flexible LNG plant 208.

For example, a first compression system 302A may be configured to provide the base load refrigerant capacity to the flexible LNG plant to maintain a minimum production level for the LNG. The first compression system 302A may only couple to the electrical bus 306 to power a startup motor for starting the gas turbine, as indicated by line 308.

A second compression system 302B may have a full sized motor/generator in parallel with the gas turbine and a compressor string. As used herein, in "parallel" indicates that the mechanical power used or produced by a unit is coupled to the mechanical power produced or used by another unit. This may be the case, for example, if the two units share a drive shaft or other mechanical systems used to transfer mechanical energy. As indicated by line 310, the second compression system 302B may be configured to provide electrical power to the electrical bus 306 or to use electric power from the electrical bus 306 (for example, to start a gas turbine).

A third compression system 302C can use electric motors to drive a compressor string, and may only be in operation when excess power is available on the grid 306, as indicated by line 312. The compression section 220 is not limited to the configuration shown, as any number of compression systems 302 may be added or removed from the compression section 220.

Figure 4:
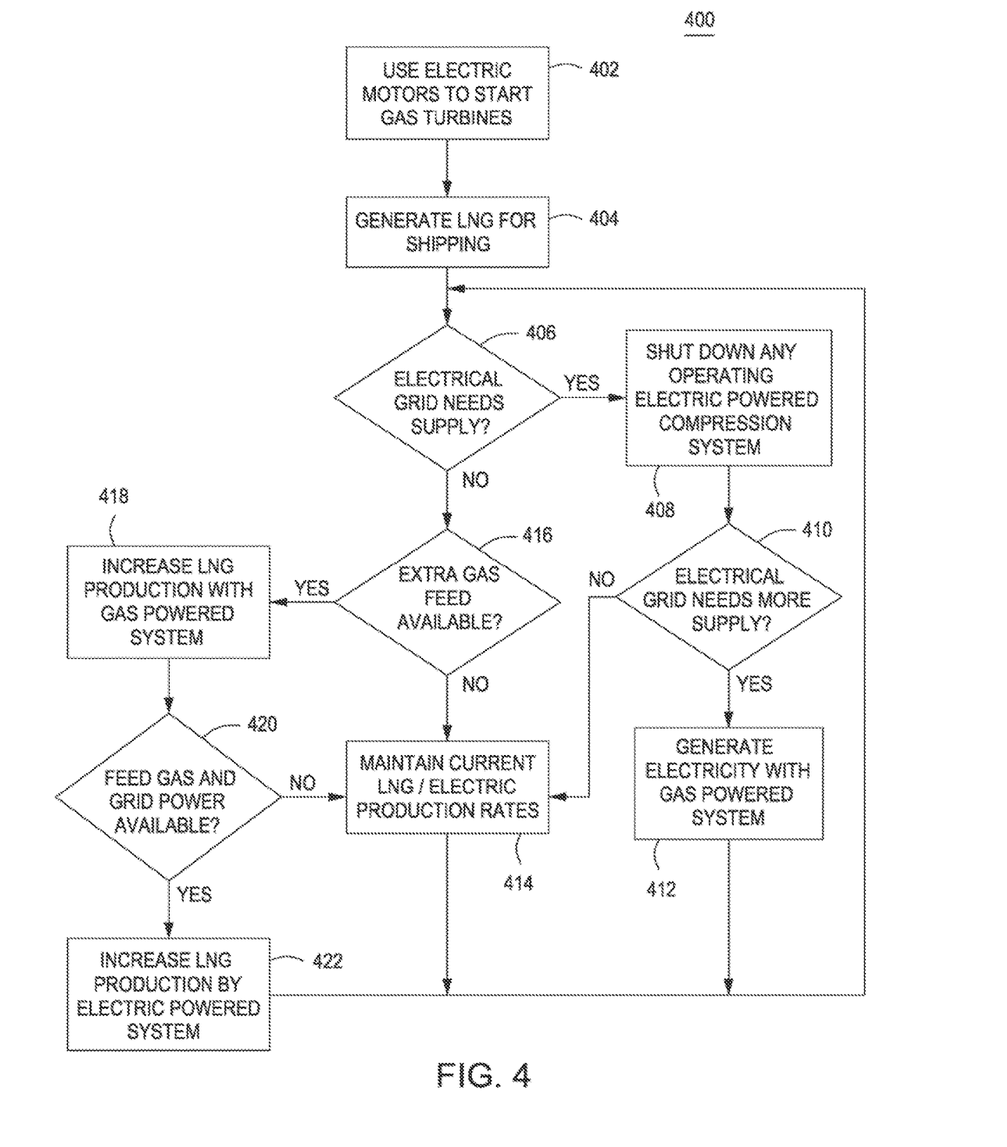
FIG. 4 is a process flow diagram illustrating a method for operating a flexible LNG plant.

The compression section 220 shown in FIG. 3 is inherently more scalable than traditional LNG processes because it allows for incremental refrigeration horsepower to be easily added to (or removed from) a centralized "compressor bank," which supplies refrigerant to heat exchangers used to cool and liquefy the LNG, as discussed with respect to the method shown in FIG. 4.

FIG. 4 is a process flow diagram illustrating a method 400 for operating a flexible LNG plant. The method 400 begins at block 402 with the use of the motors or motor/generators to start up the gas turbines. Gas turbine engines may require significant rotational speed before the compression and combustion cycles become self sustaining. Thus, the motors or motor/generators may be used for this purpose. In some embodiments, the electric motor may be eliminated from a system that is used for base load capacity. In this case, the rotational start up may be performed by other techniques, such as using small starting motors with clutches, diesel engines, air starters, and the like. At block 404, the flexible LNG plant enters a baseload LNG production, for example, with a single compression system providing refrigerant sufficient to produce about 375 MMSCFD of LNG. It should be understood that a compression system is not limited to this capacity, as larger or smaller compression systems may be used in exemplary embodiments of the present techniques. Further, the baseload capacity of the flexible LNG plant may be adjusted by including compression systems with larger or smaller capacities.

After startup, the operator of the flexible LNG plant may decide what units to operate based on the current circumstances. For example, at block 406, a determination may be made as to whether the electrical grid needs more power, such as at peak demand periods. If so, at block 408 any electric motor driven compressor strings may be disabled (if not already shut down) leaving only gas turbine driven compressor strings operational. The techniques are not limited to full operation or full shutdown, as the electric motor driven compression systems may allow for significant turndown before being completely deactivated. At block 410, a determination is made as to whether still more power is needed by the electrical grid. If more power is needed, at block 412, one or more gas turbine driven compression systems may be switched from refrigerant compression duty to electric generation duty, if available, further reducing the LNG production. From block 412, process flow returns to block 406. If more power is not needed at block 410, at block 414, the current LNG/electric power production rates are left unchanged and process flow returns to block 406 to determine whether more electricity is needed by the grid.

If a determination is made at block 406 that more power is not needed by the grid, process flow proceeds to block 416, where a determination is made as to whether excess feed gas is available. For example, the excess feed gas may be the amount of feed gas that is greater than the amount currently being used by customers on a pipeline. If extra feed gas is not available, the current production rates are maintained, as indicated at block 414. Flow then returns to block 406 to determine if the electric grid needs more power.

If extra feed gas is available, flow proceeds from block 416 to block 418. At block 418, the production of LNG can be increased by increasing the refrigerant compression duty by placing one or more gas turbine driven compression systems, if any are available, into refrigerant service. At block 420, a determination is made as to whether both feed gas and electric grid power are still available. If so, at block 422, electric motor driven compression systems, if any are available, can be brought on-line to increase the refrigerant compression and the production of LNG. If at block 420 a determination that either more feed gas or electrical power is not available, then the current production rates are maintained, as indicated at block 414. Flow then returns to block 406 to determine if the electric grid needs more power. The flexible production method discussed herein allows for optimizing the balance of power and LNG production throughout a year as shown in FIG. 5.

Figure 5:
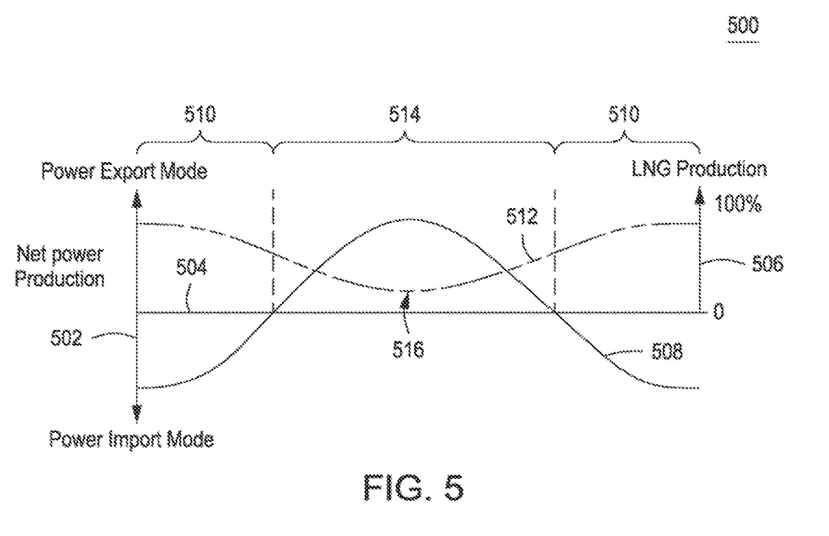
FIG. 5 is a graph illustrating the operational balance between LNG production and power production in the flexible LNG plant.

FIG. 5 is a graph 500 illustrating the operational balance between LNG production and power production in a flexible LNG plant. In the graph 500, the first y-axis 502 indicates the net electrical power production or usage by the flexible LNG plant. The x-axis 504 indicates time, for example, over the course of a year. Above the x-axis 504, the first y-axis 502 indicates the flexible LNG plant would be producing power for the electric grid, i.e., in a power export mode. Below the x-axis 504, the first y-axis 502 indicates that the flexible LNG plant would be using power from the grid, i.e., functioning in a power import mode. The second y-axis 506 indicates the LNG production from 0 to 100% of full capacity.

When power 508 is available on the grid, as indicated by reference numerals 510, the flexible LNG plant can function in a power import mode, pulling power 508 from the grid to operate electric motor driven compression systems and increase the amount of LNG produced 512. During periods 514 where more power 508 is needed by the electric grid, the flexible LNG plant can function in a power export mode by switching some of the gas turbine driven compression systems to power generation service, lowering the amount of LNG produced 512. As one string may be dedicated to LNG production, the amount of LNG produced 512 may not go below a minimum 516. This keeps the plant in operation, allowing faster switchover times than if the LNG production should stop, which could allow the plant to warm up, delaying the restart of LNG production.

When gas availability is high and grid demand is low, all three strings can operate in compression mode to maximize LNG production. As the ambient temperature increases and the power demand from the local grid increases, the power available for electric motor driven compression systems decreases, and LNG production 512 is lowered. At the point of maximum power demand during the summer, most of the gas turbine driven compression systems (such as the second compression system 512 discussed with respect to FIG. 5) may be dedicated to power generation and the electric motor driven compression systems will be idled. Thus, at peak power demand on the grid, only one gas turbine compression system may be providing refrigerant for a base load LNG production 512. As development continues in the region around the flexible LNG plant, there may reach a time where LNG production is stopped. At that point, the remaining assets of the flexible LNG plant may be used to generate electrical power for the grid, potentially saving the cost of building a new power plant.

Figure 6:
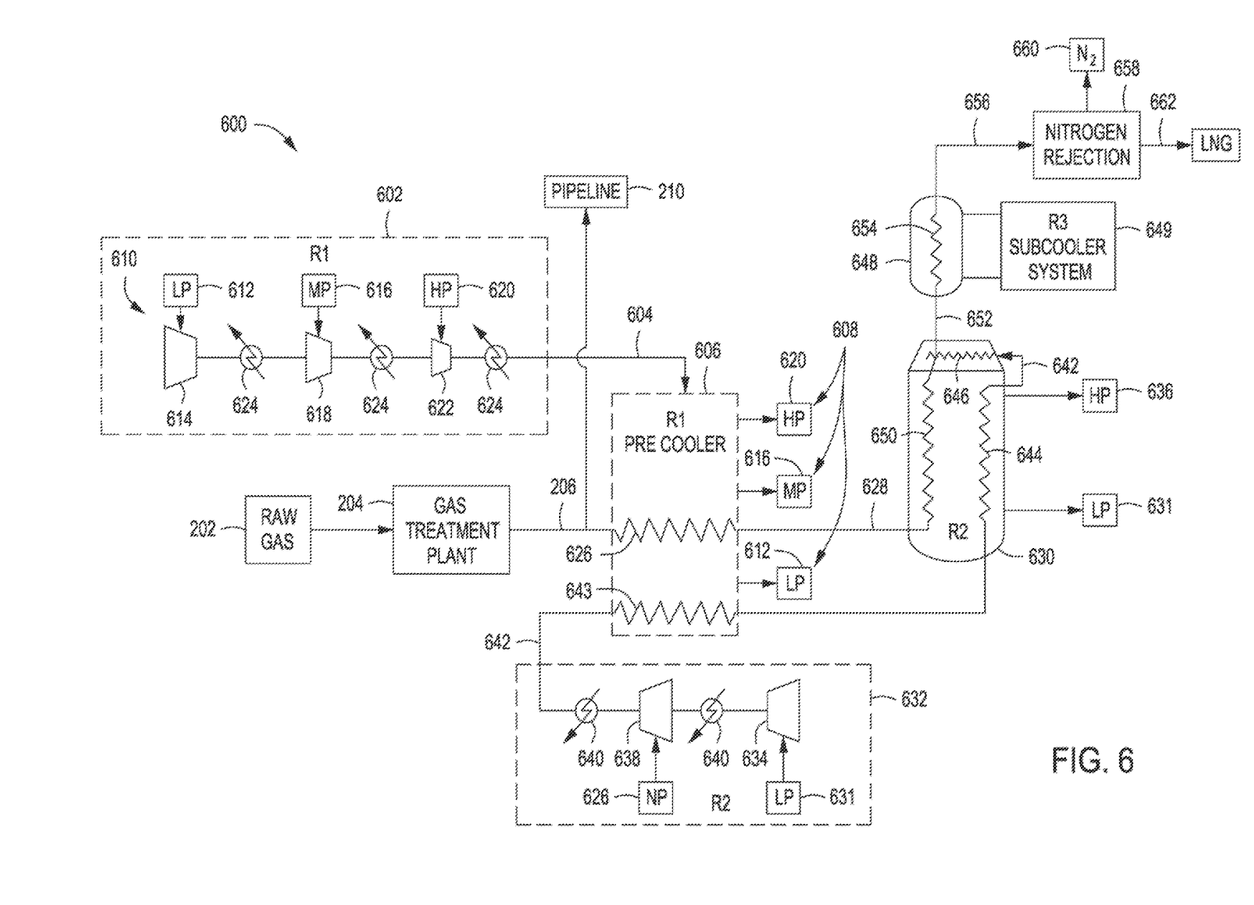
FIG. 6 is a process flow diagram for a liquefaction process unit.

FIG. 6 is a process flow diagram for a liquefaction process unit 600 that may be used in the flexible LNG plant 208. The techniques are not limited to the process shown, as any number of liquefaction processes may be used in embodiments of the present techniques. For example, the liquefaction process may be based on the C3MR or AP-X™, available from Air Products Corp., single mixed refrigerant technologies, or any number of other technologies known in the art.

The liquefaction process unit 600 may use multiple refrigerants in different cycles to cool the treated natural gas 206. For example, a first compressor string 602 may provide a high pressure liquid stream 604 of a first refrigerant to a precooler 606. The first refrigerant may be propane or a mixed hydrocarbon refrigerant that may include methane, ethane, propane, or butane, among others. The mixture of hydrocarbons used as a refrigerant may be made depending on the temperature desired for the system. The precooler 606 may have multiple pressure zones 608 which may each return a vapor stream to individual compressors (or compressor stages) 610 in the compression system 602. For example, a low pressure zone may feed a low pressure vapor 612 to a first stage compressor 614 in the compressor string 602. A medium pressure zone may feed a medium pressure vapor 616 to a second stage compressor 618. Similarly, a high pressure zone may feed a high pressure vapor 620 to a third stage compressor 622. The outlet flow from each compressor 614, 618, and 622 may be fed through a chiller 624 to remove the heat from the compression, which may allow the refrigerant to condense. Each of the zones will be at a different temperature, due to the differences in the pressure of the vapor. Although the three zones are shown coming from particular points on the precooler 606, neither the arrangement nor the number of zones is limited to that shown. In some embodiments, the precooler 606 may have two zones, four zones, or any other number of zones.

In the precooler 606, the treated natural gas 206 can be passed through a heat transfer unit, such as, for example, an aluminum finned heat exchanger 626. The heat transfer unit is not limited to aluminum finned heat exchangers, as any suitable technology may be used. The cooled natural gas 628 can be used as a feed to a main cooling heat exchanger (MCHE) 630, which may use a second compressor string 632 to provide additional cooling. As for the precooler 606, the MCHE 630 may have multiple zones that return refrigerant vapor to compressors at different pressures, such as a low pressure vapor 631 that is returned to a first stage compressor 634 and a high pressure vapor 636 that is returned to a second stage compressor 638. As for the precooler 606, the number and arrangement of the zones is not limited to that shown in FIG. 6. Chillers 640 can be used to remove the heat of compression from the second refrigerant.

A high pressure stream of the second refrigerant 642 can be flowed through a heat exchanger 643 in the precooler 606, which may allow the transfer of heat to the first refrigerant to condense the second refrigerant. The second refrigerant 642 may then be flowed into a heat exchanger 644 in the MCHE 630. After flowing through the heat exchanger 644, the second refrigerant 642 may be used for further cooling by being flashed through a spray head 646 in the MCHE 630. In some embodiments, the second refrigerant 642 may be flashed in a subcooler 648. In an exemplary embodiment, the subcooler 648 is cooled by a third compressor string 649, which may use methane, nitrogen, or another refrigerant.

The cooled natural gas 628 from the precooler 606 may flow through a heat exchanger 650 in the MCHE 630 to further chill and condense the natural gas. The chilled natural gas 652 may be flowed through a heat exchanger 654 in the subcooler 648 to finish the condensation process. After the subcooler 648, the condensed natural gas 656 may flow through a nitrogen rejecter 658, which removes nitrogen 660 producing the final LNG 662 product. The LNG 662 may then be transferred to a loading area for loading onto a shipping or cargo vessel.

The first compressor string 602 and the second compressor string 632 are not limited to a single train of compressors as shown in FIG. 6, but may be placed in parallel with multiple compressor trains to provide the compressed refrigerants as utilities to the precooler 606, MCHE 630, and the subcooler 648. An example of this are the first compressor strings 602A, 602B, and 602C and second compressor strings 632A, 632B, and 632C shown in FIG. 7. In an exemplary embodiment of the present techniques, at least a portion of the compressor trains may be configured to provide either compressed refrigerant to the chillers or electrical power to a utility grid.

Flexible Refrigerant and Electrical Utilities

Figure 7:
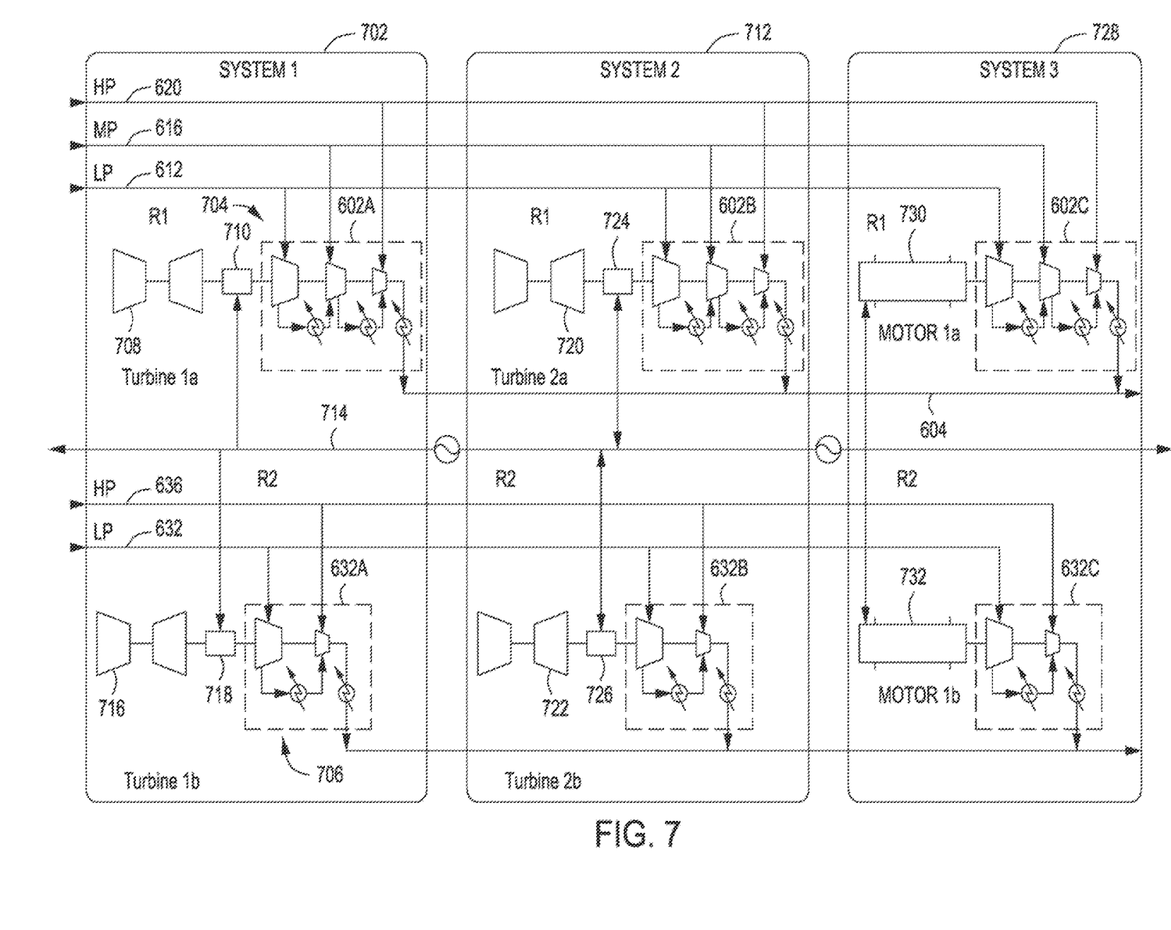
FIG. 7 is a block diagram illustrating compression systems for a flexible LNG plant that may generate either compressed refrigerant or electricity.

FIG. 7 is a block diagram illustrating compression systems for a flexible LNG plant that may generate either compressed refrigerant or electricity. In the exemplary embodiment of a compression section 220 (FIG. 2) shown in FIG. 7, there are three compression systems. Two compression systems are gas turbine driven and may use the configurations discussed further with respect to FIGS. 8-12. The third compression system may have the same size of compressor strings as the other compression systems, but can be electric motor driven and may only be operated in power import mode. One of ordinary skill in the art will recognize that the techniques are not limited to the configuration shown, as any number of other configurations may be used while remaining within the scope. For example, each of the compression systems may be of different sizes and capacities to match the capacity needs. This may be useful if excess power sufficient to power a full sized compressor string is not typically available from the electric grid, indicating that a smaller electric motor compression system would be useful.

In the flexible arrangement shown, multiple compression systems may be used in parallel for each refrigerant service. The compressor strings for each refrigerant can share manifolds to feed a shared set of piping and exchangers, although they may also feed separate isolated refrigerant loops within shared exchangers. Each of the sets of compressor strings are grouped into a compression system that is capable of liquefying an amount of natural gas. In an exemplary embodiment, the compressor strings in all three compression systems are identical and each capable of the liquefaction of 375 MMSCFD of natural gas. However, the flexible LNG plant is not limited to this size, as larger or smaller compression systems may be used depending on a desired capacity level. Further, more compression systems can be added to increase the capacity of the flexible LNG plant.

As shown in FIG. 7, a first compression system 702 may include a first refrigerant system 704 and a second refrigerant system 706. More refrigerant systems may be included in the first compression system 702 if more refrigerants are used, for example, if a third refrigerant system 649 is used to chill a subcooler 648, as discussed with respect to FIG. 6.

The first refrigerant system 704 can include a gas turbine 708, an electric motor 710 (or motor/generator), and a first compressor string 602A, as described with respect to FIG. 6.

The gas turbine 708 may be a Frame 6 (rated at about 42 MW), LM6000 (rated at about 42 MW), Frame 7 (rated at about 63 MW), or a Frame 9E (rated at about 126 MW), available from GE Corporation, or any number of other turbines of other sizes available from GE Corporation or other suppliers. As the first compression system 702 may be used to provide base load capacity for LNG production, the motor 710 may only be used for startup and, thus, may be sized smaller than the gas turbine 708. For example, a 45 MW direct drive AC motor may be used with a Frame 9E gas turbine. However, the motor 710 in the first string 702 is not limited to a smaller size as the motor may be a motor/generator sized to match the output of the gas turbine 708, as discussed in detail below. The motor 710 may be powered from an electrical bus 714. The electric bus 714 can be coupled to an external electric grid, such as electric grid 214, discussed with respect to FIG. 2. The compressors of the first compressor string 602A can be sized to match the full output of the gas turbine 708, taking advantage of the energy provided to maximize production of the first refrigerant 604.

The second refrigerant system 706 may have a gas turbine 714 that is proportionally sized to the refrigeration requirements of the second compressor string 632A in relation to the first compressor string 602A. Further, the motor 718 may be similar to the motor 710 used for the first refrigerant system 704. In other words, if the motor 710 used for the first refrigerant system 704 is a motor/generator sized to match the gas turbine 708, the motor 718 on the second refrigerant system 706 may also be a motor/generator sized to match the gas turbine 716 on the second refrigerant system 706.

The second compression system 712 may also include a first compressor string 602B for the first refrigerant and a second compressor string 632B for the second refrigerant. In an embodiment, the gas turbines 720 and 722 in the second compression system 712 may be sized to match the corresponding gas turbines 708 and 716 in the first compression system 702. However, the gas turbines 720 and 722 are not limited to matching the size of the gas turbines 708 and 716 in the first compression system 702. For example, if a larger swing capacity is desired for the plant, the gas turbines 708 and 716 selected for the first compression system 702 may be smaller, reducing the baseload capacity. In this configuration, the larger gas turbines 720 and 722 of the second compression system 712 may provide a greater swing capacity between electric generation and LNG production.

In an exemplary embodiment, the second compression system 712 uses motor/generators 724 and 726 that are sized to match the output of the gas turbines 720 and 722, allowing full power generation from the gas turbine 720 and 722. Thus, if a Frame 9E gas turbine, capable of generating about 126 MW of power, is selected for the gas turbine 720 used to drive the first compressor string 602B, a motor/generator 724 that is capable of generating 126 MW of electricity may also be selected. Accordingly, if the gas turbine 720 and motor/generator 724 are decoupled from the first compressor string 602B of the second compression system 712, as discussed with respect to FIGS. 10-12, the motor/generator 724 may be used to generate electrical power that can be supplied to the electrical bus 714 and transmitted to an external utility grid. Similarly, the size of the motor/generator 726 for the second refrigerant system in the second string 712 may be matched to the size of the gas turbine 722 for generating electricity when not in use for LNG production.

In an exemplary embodiment, the motor 710 of the first compression system 702 is a motor/generator that is sized to match the gas turbine 708, enabling the first compression system 702 to be fully interchangeable with the second compression system 712 during operation. This configuration allows either the first compression system 702 or the second compression system 712 to provide electrical power to an outside utility, while the other compression system may be used to provide compressed refrigerant to the LNG plant, used to generate electricity, or shut down for servicing.

The third compression system 728 can include a first compressor string 602C and a second compressor string 632C that are similar to the compressor strings in the first compression system 702 and the second compression system 712. However, the third compression system 728 may use electric motors 730 and 732 to power the compressor strings 602C and 632C. Thus, the third compression system 728 can be used to increase the output of the LNG plant when excess electrical power and gas are available. Speed control for the motor driven string may be supplied by a variable frequency drive (VFD) or a mechanical variable speed drive employing a torque converter, such as the Voith Vorecon supplied by Voith AG.

The compressor strings (602A, 602B, 602C, 632A, 632B and 632C) of the first compression system 702, second compression system 712, and third compression system 728 may be run in parallel such that the compressor strings in one or more compression systems 702, 712, and 728 can be shut down to reduce the LNG production rate. As discussed above, the gas turbines of the first compression system 702 or second compression system 712 may be connected to full size motor/generators, for example, with a clutch separating the gas turbine shaft from the compressor shaft. Thus, when the gas turbines are running in power generation mode, the clutch may be used to decoupled the compressors from the gas turbine shaft. Further, the motor/generators can be equipped with a VFD with an active front end so they can operate as a generator or a starter motor.

As described herein, exemplary embodiments of the present techniques use multiple compression systems in parallel, wherein the compression systems use a combination of gas turbine and electric motors as drive systems. Further, the gas turbine-driven motor/generators of the compression systems may be used to generate power during peak power demand periods.

Compressor Drive Arrangements

A number of drive configurations may be used for the compression systems used in the flexible LNG plant. Examples of the gas turbine and motor drive configurations for the compression systems are discussed with respect to FIGS. 8-12.

Figure 8:
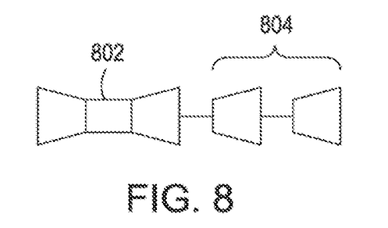
FIG. 8 is an illustration of a gas turbine directly connected to a compressor string.

FIG. 8 is an illustration of a gas turbine 802 that is directly connected to a compressor string 804. This configuration may be used for providing the base load refrigerant supply for the LNG production, as no connection is made to a motor/generator. Although there is no continuous-duty starter/helper motor for starting the gas turbine in this configuration, there are a number of conventional ways for starting one- or two-shaft gas turbines that drive a compressor string with this arrangement. For example, an auxiliary motor may be located on a separate shaft, using a clutch to couple the auxiliary motor to the shaft of the gas turbine engine. The auxiliary motor may be rated at less than about 5% of the gas turbine rated power.

Figure 9:
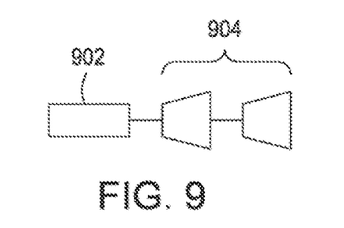
FIG. 9 is an illustration of an electric motor driven compressor string.

FIG. 9 is an illustration of an electric motor 902 that is directly connected to a compressor string 904. This configuration may be used for the third compression system 728 (discussed with respect to FIG. 7), which may be used to increase LNG production when extra gas feed and electric power is available.

Figure 10:
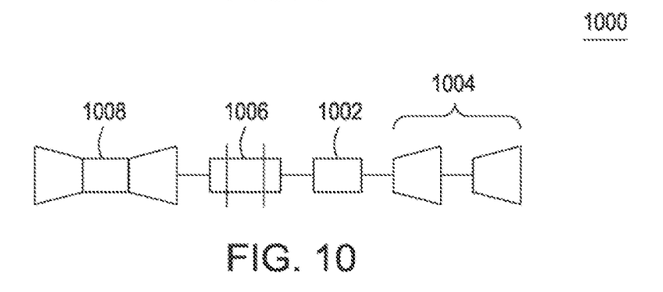
FIG. 10 is an illustration of a gas turbine driven compressor string having a clutch that can be used to decouple a compressor string from a motor/generator.

FIG. 10 is an illustration of a gas turbine drive compression system 1000 having a clutch 1002 that can be used to decouple a compressor string 1004 from a motor/generator 1006. In power generation mode, the clutch 1002 can be disengaged, leaving the gas turbine 1008 coupled to the motor/generator 1006. This can be used to prevent energy transfer from the gas turbine 1008 to the compressor string 1004, while generating power with the motor/generator 1006. In compression mode, the clutch 1002 is engaged and mechanically connects the compressor string 1004 to the gas turbine 1008 through the motor/generator 1006. Additionally, in compression mode, the motor/generator 1006 may be used to provide supplemental horsepower to the compressor string 1004. This mode of operation may be useful when the LNG plant is running at peak capacity and higher compression horsepower is desired.

In power generation mode, a variable frequency drive (VFD) can be used to allow for variable speed operation of the motor/generator 1006 while maintaining a constant frequency output in the AC power generated. In some embodiments, a mechanical variable speed drive employing a torque converter may be used in place of the clutch 1002. In this arrangement, no VFD is needed, as the speed of the motor/generator 1006 is kept constant, which keeps the frequency of power generated constant. Further, in compression mode, the use of a mechanical variable speed drive allows the speed of the compression system 1004 to be controlled even while the motor/generator 1006 is at a constant speed.

Figure 11:
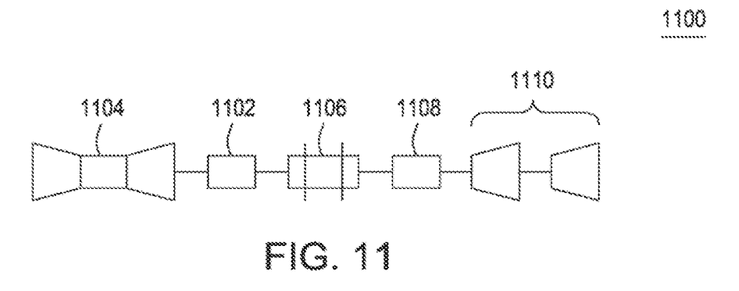
FIG. 11 is an illustration of a gas turbine driven compressor string that has a first clutch between a gas turbine and a motor/generator, and a second clutch between the motor/generator and a compressor string.

FIG. 11 is an illustration of a gas turbine drive compression system 1100 that has a first clutch 1102 between a gas turbine 1104 and a motor/generator 1106, and a second clutch 1108 between the motor/generator 1106 and a compressor string 1110. In addition to the operational capabilities described with respect to FIG. 10, the first clutch 1102 may be used to decouple the gas turbine 1104 from the motor/generator 1106, allowing an electrical drive arrangement for the compressor string 1110 when grid power is available. When the electric grid needs power, the second clutch 1108 between the motor/generator 1108 and compressor string 1108 can be disengaged and the first clutch 1102 can be engaged to allow operation in power generation mode.

Figure 12:
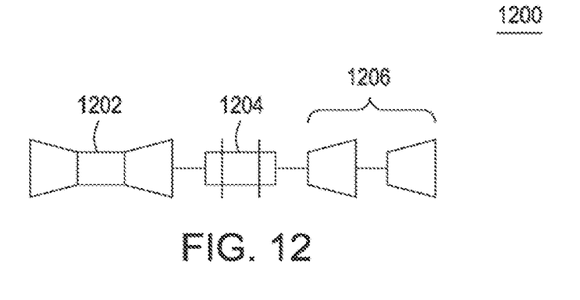
FIG. 12 is an illustration of a gas turbine driven compressor string in which a gas turbine is directly coupled to a motor/generator and a compressor string.

FIG. 12 is an illustration of a gas turbine drive compression system 1200 in which a gas turbine 1202 is directly coupled to a motor/generator 1204 and a compressor string 1206. In this embodiment, external loading and unloading of the compressor string 1206 may be lower the loading on the motor/generator 1204 to support a power generation mode.

In an exemplary embodiment of the present techniques, steam turbines are used to drive a compression system or generator to improve the overall thermal efficiency of the process. Heat recovery units on the exhaust from the gas turbines can be used to power steam generators, and the steam from the steam generators can be used to power the steam turbines. Duct burners and supplemental firing may be used to allow for the steam turbines to be sized equivalently to the gas turbines.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for producing liquefied natural gas (LNG) in a flexible LNG plant having first and second compression systems arranged in parallel, comprising:
   producing a base load of refrigeration capacity for LNG production from the first compression system;
   when a demand for electricity exists at an external power grid, producing the electricity from the second compression system and exporting the electricity to the external power grid; and
   when the demand for electricity does not exist at the external power grid, producing a second load of refrigeration capacity for LNG production from the second compression system.

2. The method of claim 1, wherein the flexible LNG plant has a third compression system arranged in parallel with the first and second compression systems, and comprising producing a third load of refrigeration capacity from the third compression system when electricity is available from the external power grid to power the third compression system and natural gas feed is available to produce LNG.

3. The method of claim 2, wherein the first compression system, the second compression system, and the third compression system share inlet and outlet manifolds for a refrigerant.

4. The method of claim 1, further comprising increasing compression power in the first compression system by powering a generator from the external power grid, wherein the generator is in series with a gas turbine coupled to a compressor string.

5. The method of claim 1, further comprising increasing compression power in the second compressor string by powering a generator from the external power grid, wherein the generator is in series with a gas turbine coupled to a compressor string.

* * * * *